US010814848B2

(12) United States Patent
Schlitzkus et al.

(10) Patent No.: US 10,814,848 B2
(45) Date of Patent: Oct. 27, 2020

(54) HYDRAULIC BLOCK FOR A HYDRAULIC ASSEMBLY OF A BRAKE CONTROL SYSTEM OF A HYDRAULIC VEHICLE BRAKE SYSTEM

(71) Applicant: Robert Bosch GmbH, Stuttgart (DE)

(72) Inventors: Michael Schlitzkus, Dietmannsried (DE); Rainer Fuerst, Kempten (DE); Thomas Zander, Oberstaufen (DE); Alexander Bareiss, Immenstadt (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/473,187

(22) PCT Filed: Nov. 16, 2017

(86) PCT No.: PCT/EP2017/079394
§ 371 (c)(1),
(2) Date: Jun. 24, 2019

(87) PCT Pub. No.: WO2018/121913
PCT Pub. Date: Jul. 5, 2018

(65) Prior Publication Data
US 2019/0337500 A1    Nov. 7, 2019

(30) Foreign Application Priority Data
Dec. 29, 2016 (DE) .................. 10 2016 226 304

(51) Int. Cl.
*B60T 8/36* (2006.01)
*F15B 1/04* (2006.01)
*F15B 1/02* (2006.01)

(52) U.S. Cl.
CPC ................ *B60T 8/368* (2013.01); *F15B 1/02* (2013.01); *F15B 1/04* (2013.01); *F15B 2201/21* (2013.01);
(Continued)

(58) Field of Classification Search
CPC .......... B60T 8/368; B60T 17/06; B60T 7/104; B60T 8/4275; F15B 1/02; F15B 1/04; F16L 55/053
(Continued)

(56) References Cited

U.S. PATENT DOCUMENTS 5,362,141 A * 11/1994 Beck ..................... B60T 8/3675
148/563
5,377,580 A * 1/1995 Merklein ............... F16B 21/186
277/449
(Continued)

FOREIGN PATENT DOCUMENTS

DE       197 25 240 A1    12/1998
DE       197 41 564 A1     3/1999
(Continued)

OTHER PUBLICATIONS

International Search Report corresponding to PCT Application No. PCT/EP2017/079394, dated Feb. 26, 2018 (German and English language document) (7 pages).

*Primary Examiner* — Michael Leslie
(74) *Attorney, Agent, or Firm* — Maginot, Moore & Beck LLP

(57) ABSTRACT

A hydraulic block of a slip control system of a hydraulic vehicle brake system includes a hydraulic accumulator, a hollow storage cover, and an accumulator cylinder defined partly by a blind hole in the hydraulic block and partly by the hollow storage cover. The blind hole is closed by the hollow storage cover. An accumulator piston of the hydraulic accu-
(Continued)

mulator is sealed and guided to or close to the ends in the blind hole in the hydraulic block and in the storage cover.

10 Claims, 1 Drawing Sheet

(52) U.S. Cl.
 CPC . *F15B 2201/312* (2013.01); *F15B 2201/4056* (2013.01)

(58) Field of Classification Search
 USPC .......................................................... 60/413
 See application file for complete search history.

(56) References Cited

U.S. PATENT DOCUMENTS

| | | | | |
|---|---|---|---|---|
| 6,283,732 B1* | 9/2001 | Reinartz | ................. | B60R 16/08 303/113.1 |
| 7,992,300 B1* | 8/2011 | Weh | ..................... | B23P 11/005 29/890.06 |
| 2002/0035832 A1* | 3/2002 | Nakamura | ............ | B60T 8/4081 60/413 |
| 2002/0056275 A1* | 5/2002 | Weber | .................... | F15B 1/033 60/413 |
| 2002/0171286 A1* | 11/2002 | Ohishi | .................... | B60T 8/368 303/119.2 |
| 2002/0171287 A1* | 11/2002 | Ohishi | .................... | B60T 8/368 303/119.3 |
| 2004/0074536 A1* | 4/2004 | Nakamura | ............. | B60T 8/368 137/343 |
| 2006/0277904 A1* | 12/2006 | Weber | ...................... | F15B 1/22 60/413 |
| 2008/0272646 A1* | 11/2008 | Nakazawa | .............. | B60T 8/368 303/155 |
| 2010/0287923 A1* | 11/2010 | Bareiss | ................... | B60T 8/368 60/413 |
| 2011/0108148 A1* | 5/2011 | Crimpita | ................ | B60T 17/06 138/31 |
| 2011/0277863 A1* | 11/2011 | Ryu | ....................... | B60T 7/102 138/31 |
| 2012/0266590 A1* | 10/2012 | Janes | ........................ | F15B 1/14 60/413 |
| 2014/0047973 A1* | 2/2014 | Berger | ................ | B23K 20/106 92/171.1 |
| 2014/0060030 A1* | 3/2014 | Ma | .......................... | E02F 9/123 60/413 |
| 2015/0158466 A1* | 6/2015 | Nakamura | .............. | B60T 11/16 303/3 |
| 2015/0158474 A1* | 6/2015 | Matsunaga | ............. | B60T 11/16 60/545 |
| 2016/0138617 A1* | 5/2016 | Coppedge | ................ | F15B 1/08 60/327 |
| 2019/0225203 A1* | 7/2019 | Bodmann | ............... | B60T 8/368 |

FOREIGN PATENT DOCUMENTS

| | | |
|---|---|---|
| DE | 100 16 895 A1 | 10/2001 |
| DE | 103 02 681 B3 | 8/2004 |
| DE | 10 2007 001 645 A1 | 7/2008 |
| DE | 10 2014 220 060 A1 | 4/2016 |
| GB | 2 104 595 A | 3/1983 |
| WO | 2009/077249 A1 | 6/2009 |

\* cited by examiner

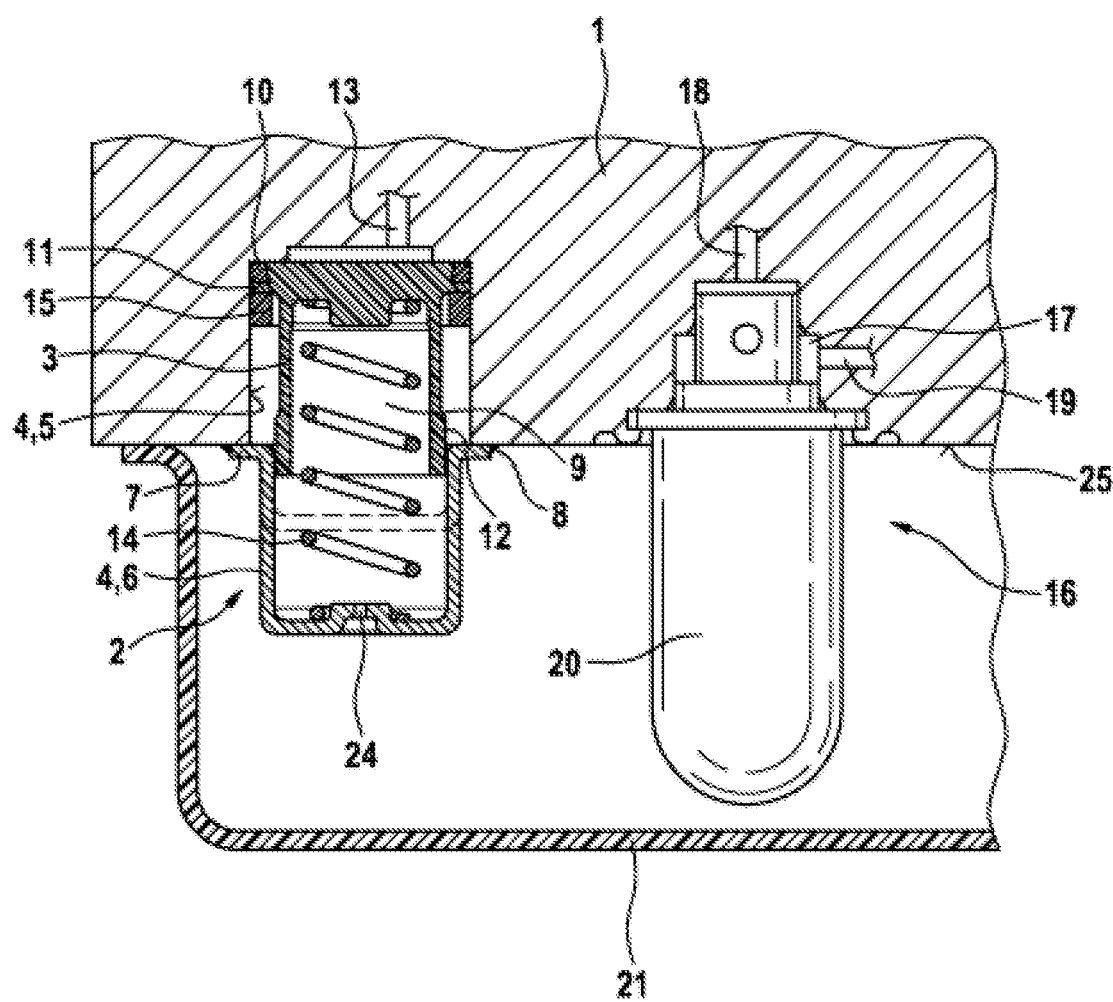

HYDRAULIC BLOCK FOR A HYDRAULIC ASSEMBLY OF A BRAKE CONTROL SYSTEM OF A HYDRAULIC VEHICLE BRAKE SYSTEM

This application is a 35 U.S.C. § 371 National Stage Application of PCT/EP2017/079394, filed on Nov. 16, 2017, which claims the benefit of priority to Serial No. DE 10 2016 226 304.8, filed on Dec. 29, 2016 in Germany, the disclosures of which are incorporated herein by reference in their entirety.

The disclosure concerns a hydraulic block for a hydraulic assembly of a brake control system of a hydraulic vehicle brake system. The disclosure furthermore concerns a method for mounting a hydraulic accumulator on such a hydraulic block.

A brake control system is in particular a slip control system, for example an antilock, traction control and/or driving dynamic control system/electronic stability program, commonly known by the abbreviations ABS, ASR, FDR/ESP. Such slip control systems of hydraulic vehicle brake systems are known in cars and motorcycles, and are not explained in more detail here. A brake control system may also be a brake pressure control system or brake force control system of a hydraulic, externally powered brake system with or without slip control.

BACKGROUND

The core of a slip control system is a hydraulic assembly having a hydraulic block which is equipped with hydraulic components of the slip control system, and connected via brake lines to a brake master cylinder and via brake lines to one or more hydraulic wheel brakes. Also, in particular for externally powered brake systems, a brake master cylinder integrated into the hydraulic block is known. Hydraulic components of the slip control system include solenoid valves, hydropumps (usually piston pumps), check valves, hydraulic accumulators, damper chambers and pressure sensors. The hydraulic block is typically a cuboid metal block which serves for mechanical fixing and hydraulic connection of the hydraulic components of the slip control system. "Connection" here means a hydraulic connection of the hydraulic components according to a hydraulic connection diagram of the slip control system. When equipped with the hydraulic components, the hydraulic block forms a hydraulic assembly.

An example of a hydraulic block for a hydraulic assembly of a slip control system of a hydraulic vehicle brake system is disclosed in DE 103 02 681 B3.

Publication DE 10 2007 001 645 A1 discloses a hydraulic accumulator for a slip-controlled hydraulic vehicle brake system having an accumulator piston which is received in axially movable fashion in an accumulator cylinder. The accumulator cylinder is formed by a blind hole in a hydraulic block of the slip control system and by a dish-like accumulator cover which is arranged coaxially to the blind hole of the hydraulic block and protrudes from the hydraulic block. The accumulator piston of the known hydraulic accumulator is guided and sealed exclusively in the accumulator cover.

SUMMARY

The hydraulic block according to the disclosure is provided for a hydraulic assembly of a brake control system, in particular a slip control system of a hydraulic vehicle brake system. The in particular cuboid hydraulic block has one or more hydraulic accumulators with an accumulator piston which is axially movable in an accumulator cylinder. Preferably, the hydraulic block has one or also several hydraulic accumulators for each brake circuit of the vehicle brake system. The accumulator cylinder is formed by a blind hole in the hydraulic block and by a hollow accumulator cover which is arranged on the hydraulic block and protrudes from the hydraulic block. The accumulator piston, at or close to its ends, is guided in axially movable fashion in the blind hole of the hydraulic block and in the accumulator cover. At or close to its one end facing the hydraulic block, the accumulator piston is sealed in the blind hole of the hydraulic block. "Close to" means at a distance of up to around 3, 5 or 7% of a diameter or a length of the accumulator piston. By guiding the accumulator piston at or close to its ends, the guide of the accumulator piston rests so as to be secure against tilting in the accumulator cylinder.

Further advantageous embodiments and refinements are disclosed herein.

To mount the hydraulic accumulator on the hydraulic block, the disclosure proposes a method, wherein the accumulator piston is inserted in the blind hole in the hydraulic block which forms part of the accumulator cylinder of the hydraulic accumulator, and the hollow accumulator cover—which, after fixing to the hydraulic block, guides the end of the accumulator piston remote from the hydraulic block—is placed on the end of the accumulator piston facing away from the hydraulic block and is thereby oriented coaxially to the accumulator piston and to the blind hole. Optionally, the accumulator piston may firstly be introduced into the blind hole in the hydraulic block and then the accumulator cover placed on the accumulator piston, or conversely, firstly the accumulator piston may be introduced into the accumulator cover and then into the blind hole in the hydraulic block. The accumulator cover is movable radially to the blind hole in the hydraulic block, which forms part of the accumulator cylinder, until it is fixed on the hydraulic block, so the accumulator cover with the accumulator piston introduced into the blind hole can be or is centered by the accumulator piston. The accumulator cover may be fixed to the hydraulic block by welding or caulking for example.

BRIEF DESCRIPTION OF THE DRAWING

The disclosure is explained in more detail below with reference to an embodiment shown in the drawing. The only FIGURE shows, in an axial section, a part of a hydraulic block according to the disclosure with a hydraulic accumulator.

DETAILED DESCRIPTION

The hydraulic block 1 according to the disclosure and shown in the drawing is a cuboid metal block. It is intended for a hydraulic assembly of a brake control system of a hydraulic vehicle brake system (not otherwise depicted). Such brake control systems are for example slip control systems such as anti-lock, traction control and/or driving dynamic control systems/electronic stability programs, for which the conventional abbreviations are ABS, ASR, FDR/ESP. Brake control systems are for example also brake pressure control systems and brake force control systems of hydraulic, externally powered motor vehicle brake systems with or without slip control.

For each brake circuit, the hydraulic block 1 has a hydraulic accumulator 2 with an accumulator piston 3 which is received in axially movable fashion in an accumulator cylinder 4. The accumulator cylinder 4 is formed by a cylindrical blind hole 5 in the hydraulic block 1 and by a hollow accumulator cover 6. In the embodiment of the disclosure depicted and described, the accumulator cover 6 is a hollow cylindrical, dish-like, deep-drawn part made of metal and closed at one end, which has a flange 7 at an open end for fixing to the hydraulic block 1. The accumulator cover 6 is arranged on the hydraulic block 1 coaxially to the blind hole 5 and protrudes from the hydraulic block 1. In the embodiment of the disclosure depicted and described, the accumulator cover 6 is attached to the hydraulic block 1 by a peripheral weld seam 8 at its flange 7. Other fixing possibilities such as caulking or gluing are also possible. The shape, production method and material of the hollow accumulator cover 6 are also not decisive for the disclosure.

The accumulator piston 3 is a hollow piston open at one end and closed at another end, with a cavity 9 which, in the embodiment of the disclosure depicted and described, faces away from the hydraulic block 1. At its closed end facing the hydraulic block 1, the accumulator piston 3 is sealed by a piston seal 10 in the blind hole 5 in the hydraulic block 1. In the embodiment of the disclosure depicted and described, the piston seal 10 is a special sealing ring, the ring cross-section of which has the form of a half oval cut through obliquely. It is arranged in a peripheral ring step of the accumulator piston 3 which has an acutely angled, V-shaped cross-section, and is open at the end of the accumulator piston 3 facing the hydraulic block 1. A peripheral face of the ring step widens conically towards the end of the accumulator piston 3, so that the piston seal 10 is held axially on the end of the accumulator piston 3. Other sealing rings are possible as a piston seal 10.

Next to the piston seal 10, the accumulator piston 3 has a flange which forms a first piston guide 11 of the accumulator piston 3, which guides the accumulator piston 3 in axially displaceable fashion in the blind hole 5 in the hydraulic block 1 which forms part of the accumulator cylinder 4. The first piston guide 11 guides the accumulator piston 3 close to its end facing the hydraulic block 1. A distance of the first piston guide 11 from the end of the accumulator piston 3 is set by an axial thickness of the piston seal 10 arranged there.

At another end facing away from the hydraulic block 1, the accumulator piston 3 has a small increase in diameter which forms a second piston guide 12. The second piston guide 12 guides the accumulator piston 3, at its end facing away from the hydraulic block 1, in axially displaceable fashion in the accumulator cover 6, which together with the blind hole 5 in the hydraulic block 1 forms the accumulator cylinder 4.

A bore 13 opening at a base of the blind hole 5 in the hydraulic block 1 connects the blind hole 5 and hence the accumulator cylinder 4 of the hydraulic accumulator 2 to further hydraulic components (not shown) of the brake control system or slip control system, such as solenoid valves, check valves and/or a hydropump. A coil compression spring is arranged as a piston spring 14 in the accumulator cover 6 and in the cavity 9 of the accumulator piston 3, and rests inwardly on the closed end of the accumulator cover 6 and loads the accumulator piston 3 in the direction of the blind hole 5 in the hydraulic block 1. The accumulator cover 6 has a central hole 24, for filling and purging of the accumulator cylinder 4, on a side of the accumulator piston 3 facing away from the hydraulic block 1. The accumulator cover 6 may also be closed.

There are various possibilities for establishing different storage volumes of the hydraulic accumulator 2. One possibility is a second accumulator piston (not shown). No other parts of the hydraulic accumulator 2 need be changed. Another possibility is to arrange one or more spacer rings 15 on the accumulator piston 3 adjacent to the first piston guide 11, so as to shorten a piston stroke and thereby reduce the storage volume of the hydraulic accumulator 2. In this case, no parts of the hydraulic accumulator 2 need be changed. A third possibility for achieving a different storage volume of the hydraulic accumulator 2 is an axially shorter or longer accumulator cover 6, as indicated in the drawing with dotted lines. In this case, no part of the hydraulic accumulator 2 other than the accumulator cover 6 and possibly the piston spring 14 need be changed in order to achieve a different storage volume of the hydraulic accumulator 2. In all cases, the blind hole 5 in the hydraulic block 1 remains unchanged, wherein a change in depth of the blind hole 5 also allows a change in the storage volume of the hydraulic accumulator 2.

To mount the hydraulic accumulator 2, the accumulator piston 3 is inserted in the blind hole 5 in the hydraulic block 1 which forms part of the accumulator cylinder 4. The piston spring 14 is inserted in the cavity 9 of the accumulator piston 3, configured as a hollow piston, and the hollow cylindrical accumulator cover 6 is placed on the end of the accumulator piston 3 facing away from the hydraulic block 1 and protruding from the hydraulic block 1. The first piston guide 11, which guides the accumulator piston 3 in the blind hole 5 in the hydraulic block 1, also centers the accumulator piston 3 in the blind hole 5 which forms part of the accumulator cylinder 4 of the hydraulic accumulator 2. The second piston guide 12, which guides the accumulator piston 3 in the accumulator cover 6, centers the accumulator cover 6 on the accumulator piston 3, whereby the accumulator cover 6 is centered i.e. oriented coaxially to the blind hole 5 of the hydraulic block 1. Then the accumulator cover 6 is fixedly welded to the hydraulic block 1 or otherwise secured. Until it is secured on the hydraulic block 1, the accumulator cover 6 can move radially relative to the blind hole 5 and thus, by means of the accumulator piston 3, be centered relative to the blind hole 5. The order of assembly of the accumulator piston 3, piston spring 14 and accumulator cover 6 is not definitive for the disclosure but may deviate from the order described.

Solenoid valves 16, one of which can be seen in the drawing, are arranged in or on the hydraulic block 1, on the same side of the hydraulic block 1 and spaced apart from and next to the hydraulic accumulator 2. The solenoid valves 16 are components of the brake control system, for example inlet valves and outlet valves of a slip control system. The solenoid valves 16 are pressed into blind holes of stepped diameter in the hydraulic block 1 which form valve receivers 17, and caulked so as to be pressure-tight. The solenoid valves 16 communicate with each other through bores 18, 19 which open into the valve receivers 17, and communicate with brake line ports of a master brake cylinder (not shown) or hydraulic wheel brakes, check valves, the hydraulic accumulator 2, a hydropump or other hydraulic components of the brake control or slip control system. The rotor and coils of the solenoid valves 16 protrude outwardly from the hydraulic block 1 and are housed in valve caps 20.

On the side of the hydraulic block 1 from which the accumulator cover 6 of the hydraulic accumulator 2 and the valve caps 20 protrude, a box-like valve cover 21 is arranged on the hydraulic block 1 and covers the accumulator cover 6 of the hydraulic accumulator 2 and the valve caps 20. The valve cover 21 protects the accumulator cover 6 and the valve caps 20 from dirt and moisture, which allows the use of an open accumulator cover 6 with a central hole 24 in the closed end. It is also possible to provide the accumulator cover 6 with large passage openings. It is sufficient to provide a yoke as the accumulator cover 6 which spans the accumulator piston 3 and holds it in the blind hole 5 in the hydraulic block 1, supports the piston spring 14 and extends in the peripheral direction on two opposing sides of the accumulator piston 3 so far that it guides the accumulator piston 3 radially and in an axially movable fashion.

Equipped with the solenoid valves 16, pressure sensors, hydraulic accumulators 2, piston pumps and further hydraulic components of the slip control system of a hydraulic vehicle brake system (not shown), the hydraulic block 1 forms a hydraulic assembly which is the core of a hydraulic part of the slip control system.

The invention claimed is:

1. A hydraulic block for a hydraulic assembly of a brake control system of a hydraulic vehicle brake system, comprising:
   a hydraulic accumulator including:
      a hollow accumulator cover arranged on the hydraulic block so as to protrude from the hydraulic block;
      an accumulator cylinder defined partly by a blind hole in the hydraulic block and partly by the hollow accumulator cover; and
      an accumulator piston received in an axially movable fashion in the accumulator cylinder,
   wherein the accumulator cover guides the accumulator piston at a first end portion of the accumulator piston facing away from the hydraulic block,
   wherein, at a second end portion of the accumulator piston facing the hydraulic block, the accumulator piston is sealed and guided in the blind hole of the hydraulic block, and
   wherein the accumulator piston has a middle portion between the first and second end portions, the middle portion having a middle portion outer diameter that is less than a second outer diameter at the second end portion.

2. The hydraulic block as claimed in claim 1, wherein the accumulator piston is a hollow piston defining a cavity in a side of the accumulator piston facing away from the hydraulic block.

3. The hydraulic block as claimed in claim 1, wherein the blind hole in the hydraulic block, the accumulator piston, a piston spring, and/or the accumulator cover are the same for different storage volumes.

4. The hydraulic block as claimed in claim 1, further comprising:
   at least one valve receiver;
   at least one solenoid valve mechanically secured and hydraulically connected in the at least one valve receiver and protruding from the hydraulic block; and
   a valve cover arranged on a first side of the hydraulic block and covering the at least one solenoid valve,
   wherein the accumulator cover is arranged in the valve cover.

5. The hydraulic block as claimed in claim 1, wherein the second end portion includes a piston guide flange projecting radially outwardly and defining the second outer diameter, the piston guide flange interacting with the blind hole so as to guide the accumulator piston at the second end portion.

6. The hydraulic block as claimed in claim 5, wherein, at the second end portion, the accumulator piston is sealed in the blind hole of the hydraulic block by a piston seal that is arranged between the piston guide flange and a base of the blind hole.

7. The hydraulic block as claimed in claim 5, wherein the hydraulic accumulator further comprises a spacer ring interposed between the piston guide flange and the cover, the spacer ring configured to contact the accumulator cover to limit a maximum axial movement of the accumulator piston.

8. The hydraulic block as claimed in claim 5, wherein the middle portion outer diameter is less than a first outer diameter at the first end portion.

9. The hydraulic block as claimed in claim 8, wherein the accumulator cover has an inner circumferential surface that guides the first end portion of the accumulator piston, the inner circumferential surface having a smaller diameter than the blind hole.

10. A method for mounting a hydraulic accumulator on a hydraulic block for a hydraulic assembly of a brake control system of a hydraulic vehicle brake system, the method comprising:
   inserting an accumulator piston of the hydraulic accumulator in a blind hole in the hydraulic block that partly defines an accumulator cylinder in a such a way that the accumulator piston is axially movable in the accumulator cylinder and is guided at a second end portion of the accumulator piston by the blind hole, wherein the accumulator piston has a middle portion having a middle portion outer diameter that is less than a second outer diameter at the second end portion; and
   placing an accumulator cover, which is radially movable relative to the blind hole in the hydraulic block until the accumulator cover is secured to the hydraulic block and which partly defines the accumulator cylinder, on an end of the accumulator piston facing away from the hydraulic block such that the accumulator cover protrudes from the hydraulic block;
   coaxially orienting the accumulator cover with the accumulator piston; and
   securing the accumulator cover to the hydraulic block such that the accumulator cover guides the accumulator piston at a first end portion of the accumulator piston that faces away from the hydraulic block.

* * * * *